(12) United States Patent
Schumacher et al.

(10) Patent No.: US 11,498,414 B2
(45) Date of Patent: Nov. 15, 2022

(54) OPERATING FLUID TANK

(71) Applicant: KAUTEX TEXTRON GMBH & CO. KG, Bonn (DE)

(72) Inventors: Nicolai Schumacher, Bonn (DE); Alexander Pechan, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 283 days.

(21) Appl. No.: 16/625,204

(22) PCT Filed: Jun. 21, 2018

(86) PCT No.: PCT/EP2018/066580
§ 371 (c)(1),
(2) Date: Dec. 20, 2019

(87) PCT Pub. No.: WO2019/002087
PCT Pub. Date: Jan. 3, 2019

(65) Prior Publication Data
US 2020/0139807 A1 May 7, 2020

(30) Foreign Application Priority Data

Jun. 28, 2017 (DE) ...................... 10 2017 114 333.5

(51) Int. Cl.
*B60K 15/03* (2006.01)
*F01N 3/20* (2006.01)

(52) U.S. Cl.
CPC ............ *B60K 15/03* (2013.01); *F01N 3/2066* (2013.01); *B60K 2015/03348* (2013.01);
(Continued)

(58) Field of Classification Search
CPC ........... F01N 2610/1406; F01N 3/2066; B60K 2015/03493; B60K 2015/03427; B60K 2015/03348; B60K 15/03
See application file for complete search history.

(56) References Cited

U.S. PATENT DOCUMENTS

| 8,955,311 | B2 | 2/2015 | Brueck et al. |
| 9,038,374 | B2 | 5/2015 | Brueck et al. |
| (Continued) |

FOREIGN PATENT DOCUMENTS

| CN | 105431618 | 3/2016 |
| CN | 205297696 | 6/2016 |
| (Continued) |

OTHER PUBLICATIONS

English translation of International Search Report, dated Aug. 17, 2018, received in corresponding PCT Application No. PCT/EP2018/066580.
(Continued)

*Primary Examiner* — Kevin A Lathers
(74) *Attorney, Agent, or Firm* — Grossman, Tucker, Perreault & Pfleger, PLLC

(57) ABSTRACT

An operating fluid tank for a motor vehicle, in particular for storing an aqueous additive, comprising: a tank wall made of a thermoplastic material, wherein the tank wall has a top, a bottom and side walls, and the tank wall delimits a tank volume, wherein the tank volume has a height, a depth and a width; and at least one electrically operated heating device having one or more heating elements, the heating element being inserted into an outer depression of the tank wall, or into an outer recess or opening in the tank wall, or into an inner structure that is integrally formed with the tank wall and that extends into the tank volume, and said heating element extending over at least one third of the height of the tank volume and being electrically contacted outside the tank volume.

16 Claims, 2 Drawing Sheets

(52) U.S. Cl.
CPC ............. *B60K 2015/03427* (2013.01); *B60K 2015/03493* (2013.01); *F01N 2610/1406* (2013.01)

(56) References Cited

U.S. PATENT DOCUMENTS

| | | | |
|---|---|---|---|
| 9,127,583 | B2 | 9/2015 | Hodgson et al. |
| 10,287,955 | B2 | 5/2019 | Hodgson et al. |
| 10,513,959 | B2 | 12/2019 | Maguin |
| 2008/0256937 | A1* | 10/2008 | Suzuki .................... F01N 13/02 60/300 |
| 2012/0225396 | A1 | 9/2012 | Harr et al. |
| 2013/0025269 | A1* | 1/2013 | Hodgson ............... F01N 3/2066 60/317 |
| 2015/0075141 | A1 | 3/2015 | Brueck et al. |
| 2015/0090724 | A1 | 4/2015 | Gross |
| 2015/0210159 | A1 | 7/2015 | Maguin et al. |
| 2016/0138455 | A1 | 5/2016 | Chini et al. |
| 2016/0146082 | A1* | 5/2016 | Hodgson ............... F01N 3/2066 60/300 |
| 2017/0074257 | A1 | 3/2017 | Chini et al. |

FOREIGN PATENT DOCUMENTS

| | | |
|---|---|---|
| CN | 106812573 | 6/2017 |
| DE | 102009041179 | 3/2011 |
| DE | 102009041938 | 3/2011 |
| DE | 102010004614 | 7/2011 |
| DE | 102010024022 | 12/2011 |
| DE | 102012108273 | 3/2014 |
| DE | 102012218598 | 4/2014 |
| DE | 102014223517 | 5/2016 |
| DE | 102014118720 | 6/2016 |
| EP | 2336515 | 6/2011 |
| EP | 2650497 | 10/2013 |
| EP | 2857645 | 4/2015 |
| JP | 2006144562 | 6/2006 |

OTHER PUBLICATIONS

English translation of Written Opinion, dated Aug. 17, 2018, received in corresponding PCT Application No. PCT/EP2018/066580.

* cited by examiner

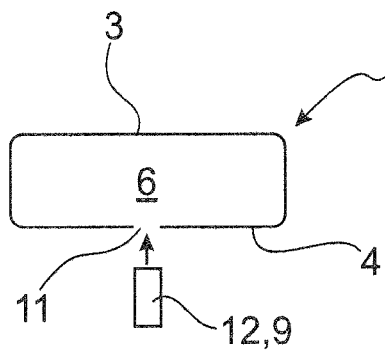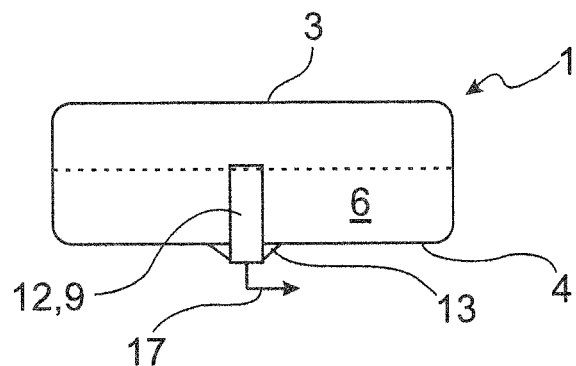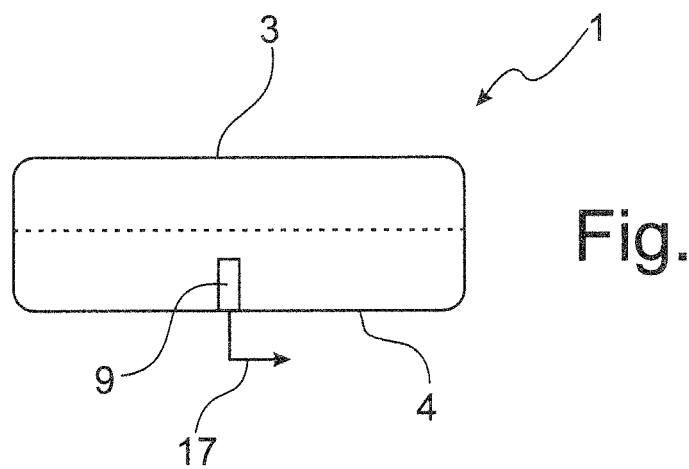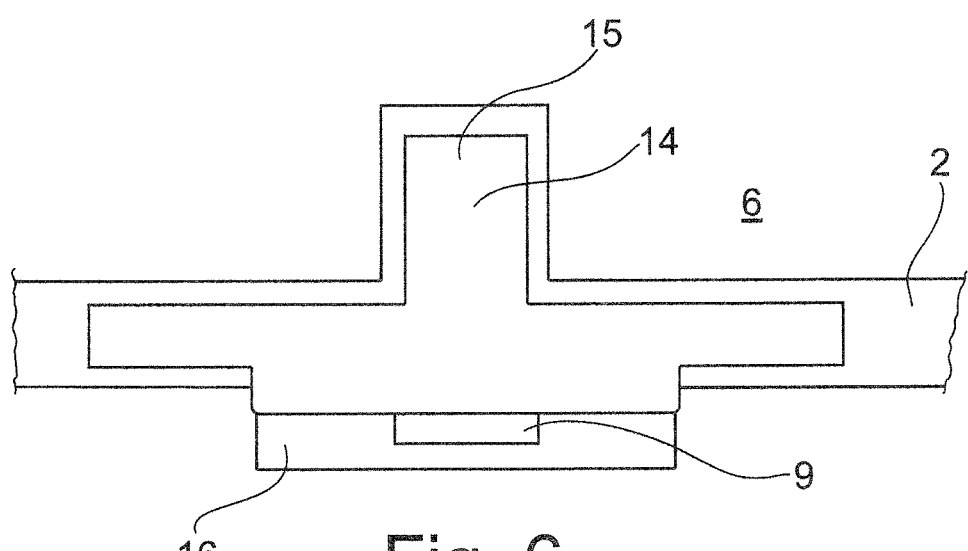

OPERATING FLUID TANK

FIELD

The invention relates to an operating fluid tank for a motor vehicle, in particular for storing an aqueous additive, with a tank wall made of thermoplastic material, wherein the tank wall comprises a top, a bottom and side walls, the tank wall delimits a tank volume and wherein the tank volume has a height, a depth and a width, wherein the operating fluid tank has an electrically operated heating device.

BACKGROUND

Operating fluids in motor vehicles, such as for example windshield wash fluid, additives for exhaust-gas denitrogenization and the like, can freeze at low ambient temperatures. This is not desired, in particular in the case of additives for exhaust-gas denitrogenization, since a system for exhaust-gas purification is not available as long as no additive is delivered.

Modern diesel passenger cars are equipped with systems for selective catalytic exhaust-gas denitrogenization (SCR catalytic converters). Here, an aqueous urea solution, also known under the trade name "Ad Blue", is fed to the catalytic converter, which in a system of this type is arranged in the exhaust-gas tract of the passenger car. The urea solution is stored in an operating fluid tank in the passenger car. At ambient temperatures of less than 11° C., under atmospheric pressure, the urea solution begins to freeze. To prevent this, heated operating fluid tanks are known. It is also known to heat the lines and injectors necessary for metering the urea solution.

A heatable operating fluid tank for storing an aqueous urea solution is described, for example, in DE 10 2014 223 517 A1. The motor vehicle operating fluid tank described in said document comprises a planar heating device which acts as an electrical resistance and is arranged between two plastic films in a sandwich-like manner Internal flexible heating systems of this type have to be media-resistant and are susceptible to loads caused by ice pressure or to the actions of force caused by the fluid sloshing to and fro within the operating fluid tank as a consequence of the driving dynamics.

In principle, heating of the tank volume from below has the disadvantage that, in the lower part of the tank volume, a cavity forms within the ice block located in the tank volume, specifically in the region of the for the most part underlying removal point of the container. As a result, further thawing of the ice is prevented for the most part, since the transfer of heat from the heating body or the heating element onto the ice is impaired or no longer takes place as a result of the formation of the cavity.

SUMMARY

The invention is therefore based on the object of providing a heatable operating fluid tank of the type mentioned at the beginning that avoids the above-described disadvantages.

One aspect of the invention relates to an operating fluid tank for a motor vehicle, in particular for storing an aqueous additive, for example a urea solution for selective catalytic exhaust-gas denitrogenization, with a tank wall made of thermoplastic material, wherein the tank wall comprises a top, a bottom and side walls, the tank wall delimits a tank volume, wherein the tank volume has a height, a depth and a width, with at least one electrically operated heating device which comprises one or more heating bodies, wherein the heating body is inserted in an outer depression of the tank wall or in an outer recess or an opening of the tank wall or in an inner structure formed integrally with the tank wall and extending into the tank volume, wherein the heating body extends over at least one third of the height of the tank volume and is electrically contacted outside of the tank volume.

The operating fluid tank according to the invention may be formed, for example, from a thermoplastic material based on an HDPE or on PP. The operating fluid tank may be injection molded or blow molded or deep drawn or rotationally sintered.

The operating fluid tank expediently comprises means for removing and delivering the additive, for example a pump. In addition, the operating fluid tank may have at least one filling level sensor as well as a quality sensor.

The top of the operating fluid tank is understood to be that part of the tank wall that is located at the top in the installed position of the operating fluid tank. The bottom of the operating fluid tank is understood to be that part of the tank wall that is located at the bottom in the installed position of the operating fluid tank in the passenger car.

For the purposes of the present invention, the height of the tank volume is understood to be the distance between the bottom and the top of the tank wall.

The operating fluid tank according to the invention may be of single-part and also of multi-part form. The pump, the filling level sensor and, if appropriate, the quality sensor may be part of what is termed a delivery module which is inserted exchangeably in the operating fluid tank.

The heating body of the operating fluid tank according to the invention may be arranged with respect to the tank volume such that it is not in direct contact with a medium located within the tank volume. The medium located within the tank volume may be an aqueous additive, in particular an aqueous urea solution. In principle, pure water for water injection into the internal combustion engine of a passenger car is also suitable as an aqueous additive.

The invention can be summarized by stating that, according to the invention, at least one heating body is arranged in the operating fluid tank such that it extends over a substantial part of the height of the tank volume, to be precise in such a way that an ideal input of heat in all directions into the possibly frozen medium is possible. This prevents the formation of a cavity, which prevents further delivery of the medium and further input of heat into the medium, on the bottom side of an ice block which is located within the tank volume under certain circumstances. Ideally, at least one heating body extends over at least 50% of the clear height of the tank volume. In the context of the invention, variants are provided in which at least one heating body extends over the full height of the tank volume.

The heating body may be in the form of a column or in the form of a wall.

In one advantageous variant of the operating fluid tank according to the invention, it is provided that the heating body is inserted from the outside in a depression, a recess or an opening in the bottom of the tank wall. As an alternative or in addition, it may be provided that at least one further heating body is inserted in a depression or a recess or an opening in the top of the tank wall or in a side wall of the tank wall.

For example, it may be provided that the tank wall has at least one pocket which is accessible from the outside and, within the tank volume, forms at least one wall extending over at least one third of the height of the tank volume, and that the pocket accommodates at least one heating body inserted from the outside. Within the tank volume, the wall may form a structure which has a function, for example as a baffle container or baffle wall or anti-slosh wall.

At the same time, the pocket in the tank wall forms a sheathing of the heating body inserted from the outside. By way of example, between the tank wall and the heating body, a heat-conducting substance, such as for example a heat-conductive paste, may additionally be provided which improves the transfer of heat from the heating body onto the tank wall in the region concerned. The heat-conducting substance may also be provided to compensate for a different thermal expansion between the heating body and the tank wall surrounding it. The heating body may be supported, effectively in a floating manner, in the pocket.

As an alternative, it may be provided that at least one heating body is inserted from the outside in a stiffening element extending between the bottom and the top within the tank volume. One or more stiffening elements may, for example, be formed in that the top and the bottom of the operating fluid tank are pulled in in the form of a dome and are welded to one another in the region of this recess (wall-to-wall welding). Heating bodies can be inserted in each of the depressions thus formed from the outside, and can then be relatively easily electrically contacted from the outside.

In one alternative embodiment of the operating fluid tank according to the invention, it is provided that the heating body is formed as a plastic-sheathed heating cartridge which is inserted in the bottom of the tank wall in an opening provided for this purpose. By way of example, the heating cartridge may have an integrally molded-on round plastic plate or an integrally molded-on plastic collar which is welded in, and thereby closes or seals, the relevant opening in the tank wall.

Preferably, the heating body is formed as a resistance heating element.

As an alternative, the heating body may be formed as a metal heat-conductive element which is in thermally conductive contact with at least one resistance heating element. This arrangement has the advantage that the heat-conductive element itself does not have to be a good electrical conductor. In this way, the surface area available for the exchange of heat or the dissipation of heat can be enlarged in a relatively cost-effective manner.

The metal heat-conductive element is preferably sheathed and/or encapsulated with thermoplastic material.

The metal heat-conductive element may, for example, be enclosed by the thermoplastic material of the tank wall.

If the operating fluid tank according to the invention is composed of injection-molded half-shells, one or more metal heat-conductive elements may be enclosed or encompassed by the tank wall of the operating fluid tank according to the invention.

In a preferred variant of the operating fluid tank according to the invention, the resistance heating element is selected from a group of heating elements comprising polymer-bonded resistance heating elements, PTC polymers (PPTC), pasty or gel-like PTC polymers, ceramic PTC and plastic-encased or plastic-encapsulated or plastic-sheathed ceramic PTC. For the purposes of the present invention, a PTC is understood to mean a thermistor with a positive temperature coefficient.

What is termed a heating polymer with a positive temperature coefficient is also suitable as a heating body or heating element. A heating polymer is understood to be a polymer with electrically conductive additives or fillers, such as for example carbon black. The polymer of the heating body can be heated, in particular using electrodes, the electrodes being connected to a voltage source for introducing a heating power.

The polymer may be a material that is solid or pasty at room temperature. The polymer may be a thermoplastic material. The polymer may be a polyethylene (PE).

Even though the term "heating body" is used in the context of the present patent application, it is not ruled out that the heating body has a gel-like or pasty consistency.

BRIEF DESCRIPTION OF THE DRAWINGS

The invention is explained hereinbelow on the basis of a plurality of exemplary embodiments shown in the drawings, in which:

FIGS. 4a and 4b show a fourth exemplary embodiment of the operating fluid tank according to the invention with a heating cartridge passing through the tank wall and extending into the tank volume;

FIG. 5 shows a fifth exemplary embodiment of the operating fluid tank according to the invention; and FIG. 6 shows a sixth exemplary embodiment of the operating fluid tank according to the invention with an encapsulated heat-conductive element.

DETAILED DESCRIPTION

Figure 1:
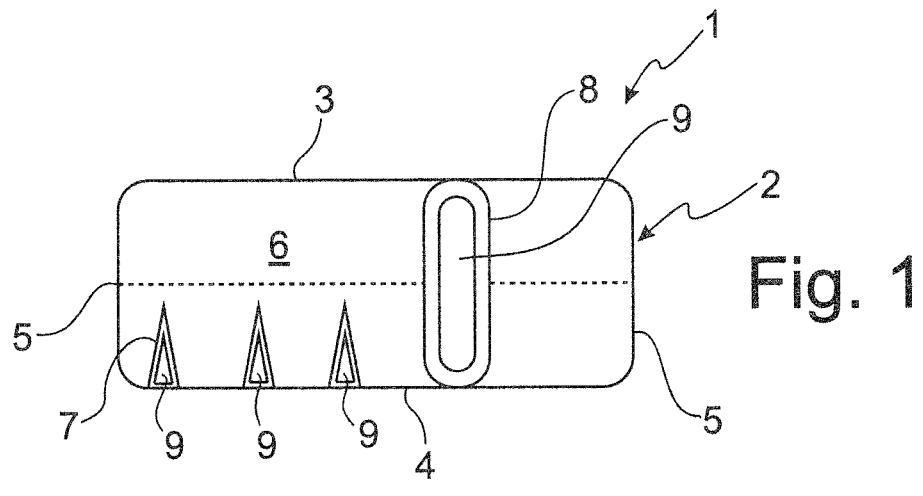
FIG. 1 shows a first exemplary embodiment of the operating fluid tank according to the invention which has heated structures within the tank volume.

The operating fluid tank 1 according to the invention is shown in a greatly simplified manner in the drawings. The operating fluid tank 1 comprises at least one filling opening and at least one removal opening as well as what is termed a delivery module (these not being shown in the drawings). By way of example, the delivery module may comprise a pump, a filling level sensor, a quality sensor etc. The delivery module is, for example, connected to a metering device which may comprise a feed line to an injection nozzle in the exhaust-gas tract of a passenger car and a return line into the operating fluid tank 1. If the operating fluid tank is provided as a water container for water injection into the internal combustion engine of a passenger car, a removal line provided in or on the operating fluid tank 1 is connected to the feed line of one or more water injection nozzles.

In the described exemplary embodiment according to FIG. 1, the operating fluid tank 1 may, for example, be composed of two injection-molded half-shells made of thermoplastic material, preferably of HDPE. The operating fluid tank 1 comprises a tank wall 2 which has a top 3 and a bottom 4 as well as side walls 5. The tank wall 2 encloses a tank volume 6.

In the exemplary embodiment according to FIG. 1, heated structures are provided within the tank volume 6, are integrally formed with the tank wall 2 and extend into the tank volume 6. These heated structures may be formed, for example, as baffle walls 7 or stiffening elements 8. The baffle walls 7 extend within the tank volume 6 over a height which is greater than approximately one third of the height of the tank volume or the distance between the top 3 and the bottom 4. The heated structures each enclose a heating body 9 which is not directly in contact with the medium stored within the tank volume 6. The heating bodies 9 may be, for example, ceramic heating bodies with a positive temperature coefficient. As an alternative, the above-mentioned heating polymers are suitable as heating bodies 9. These heating bodies 9 are electrically contacted outside of the tank volume 6 and connected to a voltage source (not shown).

Figure 2:
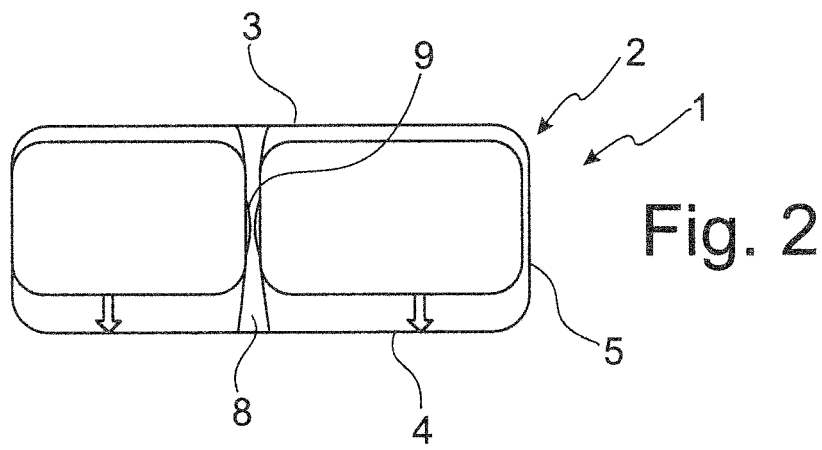
FIG. 2 shows a second exemplary embodiment of the operating fluid tank according to the invention with heated structures extending in a continuous manner between the top and the bottom.

FIG. 2 shows a second exemplary embodiment of the operating fluid tank 1 according to the invention.

In all exemplary embodiments, the same components are provided with the same reference signs.

The operating fluid tank 1 according to the second exemplary embodiment may similarly be composed of two injection-molded half-shells. The top 3 and the bottom 4 of the tank wall 2 are connected to one another via the stiffening element 8. The stiffening element 8 is formed by two column-shaped depressions in the top 3 and the bottom 4 of the tank wall, said depressions being arranged oppositely and the end faces of which are welded to one another. In the drawing, only one stiffening element 8 is shown, but the invention is to be understood such that the operating fluid tank 1 may have a multiplicity of stiffening elements 8 of this type. A heating body 8 is inserted in each of the column-shaped depressions so that a continuously heated column or support is formed between the top 3 and the bottom 4 of the operating fluid tank 1. In this way, a uniform input of heat into the tank volume 6 is achieved over the entire height of the stiffening element 8 or over the entire height of the tank volume 6 into the medium.

Figure 3:
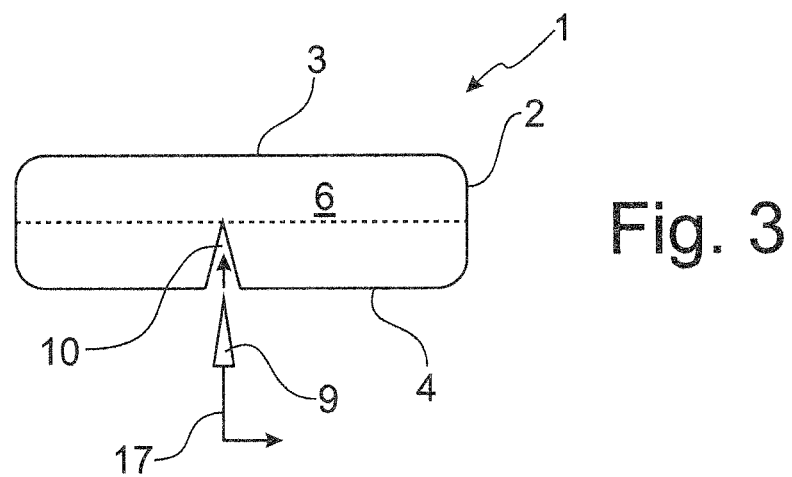
FIG. 3 shows a third exemplary embodiment of the operating fluid tank according to the invention with pockets integrated into the tank wall, in which heating bodies are inserted from the outside.

A third exemplary embodiment of the operating fluid tank 1 according to the invention is shown in FIG. 3. One or more pockets 10 are provided in the tank wall 2 of the operating fluid tank 1, each pocket 10 accommodating a heating body 9. In FIG. 3, only one pocket 10 is provided in the bottom 4 of the tank wall 2, however in principle a plurality of pockets may be provided in the tank wall 1 at various locations on the tank wall 1, that is to say both in the bottom 4 and in the top 3 and in the side walls 5. The pockets 10 are formed such that they protrude into the tank volume 6 and dip as far as possible into the fluid or into the medium. Blade-shaped molded heating bodies 9 in the form of ceramic heating elements or in the form of polymer-bonded heating elements may be inserted in the pockets 10. As already explained above, the heating elements are preferably formed as resistance heating elements with a positive temperature coefficient.

The arrangement of the heating bodies 9 in the pockets 10 allows for relatively easy electrical contacting from the outside, for example as shown, on the bottom side of the operating fluid tank. In order to improve the transfer of heat from the heating body 9 to the medium located in the tank volume 6 via the tank wall 2, it may be provided that a heating paste is provided between the heating body 9 and the tank wall 2 in the pocket 10. A connection cable 17 to a voltage source (not shown) is shown only by way of indication.

A fourth exemplary embodiment of the operating fluid tank 1 according to the invention is shown in FIGS. 4a and 4b. At least one opening 11 is provided in the tank wall 2 of the operating fluid tank 1, in which opening a heating cartridge 12 is inserted. The heating cartridge 12 comprises a heating body 9 as a resistance heating element which is encapsulated with a plastic sheath. The resistance heating element, like the above-described heating bodies 9, may be a ceramic PTC heating element, a PTC polymer or another plastic-bonded resistance heating element that has a positive temperature coefficient.

The heating cartridge 12 comprises an integrally molded-on or formed-on collar 13 made of thermoplastic material and preferably arranged at an end of the heating cartridge 12. The thermoplastic material of the sheath of the heating cartridge 12 and of the collar 13 is expediently compatible with the thermoplastic material of the tank wall 2 for the purposes of weldability. The heating cartridge 12 may be formed as a cylindrical or else plate-shaped element. Accordingly, the opening 11 may be of circular or slot-shaped form. The heating cartridge 12 is inserted in the opening 11 of the tank wall 2, the collar 13 being welded on its outer side to the tank wall 2 and sealing the opening 11. The heating cartridge 12 is electrically contacted outside of the tank volume 6 via the connection cable 17.

As an alternative, the heating cartridge 12 may be sealed in the opening 11 by means of one or more sealing elements (O-rings). In this case, welding is not necessary.

The invention is to be understood such that one or more heating cartridges 12 may be provided, each passing through the tank wall 2 at various locations and protruding relatively far into the tank volume 6, in order thus to achieve a possibly uniform transfer of heat into the medium.

A further variant of the operating fluid tank 1 according to the invention is shown in FIG. 5. The heating body 9, which extends substantially within the tank volume 6, is integrally formed with the tank wall 2 and electrically contacted from the outside. The heating body 9 may, for example, be formed as a cylindrical or plate-shaped body which has been encapsulated with a thin HDPE layer with a thickness of approximately 1 to 2 mm. The heating element finished in this way may for example have been placed into the mold during the injection molding of a shell of the tank wall 2 so that the tank wall 2 is integrally connected to the heating body. As is the case in the other exemplary embodiments, by way of example only one heating body 9 is shown, connected to the bottom 4 of the tank wall 2. The invention is to be understood such that a plurality of heating bodies 9 may be provided at various locations on the tank wall. As concerns the configuration of the heating body 9, the heating body is preferably a resistance heating element with a positive temperature coefficient, as is described in conjunction with the above-described exemplary embodiments.

A further exemplary embodiment of the operating fluid tank 1 according to the invention is shown in FIG. 6. FIG. 6 shows an enlarged section of the tank wall 2 in the region of the bottom 4. A metal heat-conductive element 14 is inserted in the tank wall 2 and encompassed in a form-fitting manner by the tank wall 2. The heat-conductive element 14 may, for example, be provided with a multiplicity of ribs 15 which are enclosed by the thermoplastic material of the tank wall 2 and form the plate-shaped or rib-shaped structures which protrude into the tank volume 6 of the operating fluid tank 1 but are not in direct contact with the medium stored in the tank volume 6. In the drawing, the metal heat-conductive element 14 comprises only a single rib 15. The heat-conductive element 14 may be formed in the manner of a heat exchanger body with an enlarged surface area. The heat-conductive element 14 may, for example, be formed from aluminum and may have been integrated into the tank wall by injection molding during the production of the operating fluid tank 1.

By way of example, the operating fluid tank 1 may also have been produced by extrusion blow molding or deep drawing. In this case, the heat-conductive element 14 may have been placed into the mold as an insert part. The heat-conductive element 14 is directly connected to a heating body 9. The heating body 9 is, for example, adhesively bonded onto the outer side and bottom side of the heat-conductive element 14 and covered with an insulating structure 16. The heating body 9 may be formed as a resistance heating element (PTC) made of the above-mentioned materials.

LIST OF REFERENCE SIGNS

1 Operating fluid tank
2 Tank wall
3 Top
4 Bottom
5 Side walls
6 Tank volume
7 Baffle walls
8 Stiffening element
9 Heating body
10 Pocket
11 Opening in the tank wall 2
12 Heating cartridge
13 Collar
14 Heat-conductive element
15 Rib
16 Insulating structure
17 Connection cable

What is claimed is:

1. An operating fluid tank for a motor vehicle, in particular for storing an aqueous additive, comprising:
    a tank wall made of thermoplastic material,
    wherein the tank wall comprises a top, a bottom and side walls, the tank wall delimits a tank volume,
    wherein the tank volume has a height, a depth and a width, with at least one electrically operated heating device which comprises at least one heating body,
    wherein the heating body is inserted in an outer depression of the tank wall or in an outer recess of the tank wall or in an inner structure of the tank wall and extending into the tank volume,
    wherein the tank wall has an inner side which faces the tank volume and an outer side which defines the outer depression, the outer recess or the inner structure,
    wherein the heating body is disposed at the outer side of the tank wall with the tank wall disposed between the heating body and the aqueous additive when stored in the tank volume,
    wherein the heating body extends over at least one third of the height of the tank volume and is electrically contacted outside of the tank volume.

2. The operating fluid tank as claimed in claim 1, wherein the heating body is arranged with respect to the tank volume such that it is not in direct contact with a medium located within the tank volume.

3. The operating fluid tank as claimed in claim 1, wherein the heating body is inserted from the outside in a depression, a recess or an opening in the bottom of the tank wall.

4. The operating fluid tank as claimed in claim 1, wherein the tank wall has at least one pocket which is accessible from the outside and, within the tank volume, forms at least one wall extending over at least one third of the height of the tank volume, and in that the pocket accommodates at least one heating body inserted from the outside.

5. The operating fluid tank as claimed in claim 1, wherein the heating body is inserted from the outside in a stiffening element extending between the bottom wall and the top wall within the tank volume.

6. The operating fluid tank as claimed in claim 1, wherein the heating body is formed as a plastic-sheathed heating cartridge which passes through the bottom of the tank wall and extends into the tank volume, and is welded to the tank wall.

7. The operating fluid tank as claimed in claim 1, wherein the heating body is formed as a resistance heating element.

8. The operating fluid tank as claimed in claim 1, wherein the heating body is formed as a metal heat-conductive element which is in thermally conductive contact with at least one resistance heating element.

9. The operating fluid tank as claimed in claim 8, wherein the metal heat-conductive element is sheathed and/or encapsulated with thermoplastic material.

10. The operating fluid tank as claimed in claim 9, wherein the metal heat-conductive element is enclosed by the thermoplastic material of the tank wall.

11. The operating fluid tank as claimed in claim 1, wherein the resistance heating element is selected from a group of heating elements comprising polymer-bonded resistance heating elements, PTC polymers (PPTC), pasty or gel-like PTC polymers, ceramic PTC and plastic-encased or plastic-encapsulated or plastic-sheathed ceramic PTC.

12. The operating fluid tank as claimed in claim 1, wherein the inner structure of the tank wall and extending into the tank volume comprises a baffle wall.

13. The operating fluid tank as claimed in claim 1, wherein the inner structure of the tank wall and extending into the tank volume comprises a stiffening element which is connected to the top wall and the bottom wall.

14. The operating fluid tank as claimed in claim 1, wherein the tank wall has the outer depression, and the heating body is inserted in the outer depression of the tank wall.

15. The operating fluid tank as claimed in claim 1, wherein the tank wall has the outer recess, and the heating body is inserted in the outer recess of the tank wall.

16. The operating fluid tank as claimed in claim 1, wherein the tank wall has the inner structure extending into the tank volume, and the heating body is inserted in the inner structure extending into the tank volume.

* * * * *